United States Patent
Wilcox et al.

(10) Patent No.: US 10,386,844 B2
(45) Date of Patent: Aug. 20, 2019

(54) SYSTEM AND METHOD FOR USING GEO-FENCED GUIDANCE LINES

(71) Applicant: Deere & Company, Moline, IL (US)

(72) Inventors: Timothy A. Wilcox, Cissna Park, IL (US); Terence D. Pickett, Waukee, IA (US)

(73) Assignee: DEERE & COMPANY, Moline, IL (US)

( * ) Notice: Subject to any disclaimer, the term of this patent is extended or adjusted under 35 U.S.C. 154(b) by 49 days.

(21) Appl. No.: 14/871,426

(22) Filed: Sep. 30, 2015

(65) Prior Publication Data

US 2017/0090479 A1 Mar. 30, 2017

(51) Int. Cl.
| | |
|---|---|
| G05D 1/02 | (2006.01) |
| A01B 69/00 | (2006.01) |
| G01C 21/34 | (2006.01) |
| H04W 4/021 | (2018.01) |
| H04W 4/029 | (2018.01) |
| H04W 4/04 | (2009.01) |

(52) U.S. Cl.
CPC ......... *G05D 1/0212* (2013.01); *A01B 69/007* (2013.01); *G01C 21/3461* (2013.01); *G05D 1/0219* (2013.01); *G05D 1/0274* (2013.01); *H04W 4/021* (2013.01); *H04W 4/029* (2018.02); *H04W 4/046* (2013.01); *G05D 2201/0201* (2013.01)

(58) Field of Classification Search
None
See application file for complete search history.

(56) References Cited

U.S. PATENT DOCUMENTS

| | | | |
|---|---|---|---|
| 6,085,135 A | 7/2000 | Steckel | |
| 6,087,984 A | 7/2000 | Keller et al. | |
| 6,128,574 A | 10/2000 | Diekhans | |
| (Continued) | | | |

FOREIGN PATENT DOCUMENTS

| | | |
|---|---|---|
| EP | 2238819 A1 | 10/2010 |
| JP | 2015167562 A | 9/2015 |
| WO | 2016032901 A1 | 3/2016 |

OTHER PUBLICATIONS

Search Report dated Feb. 2, 2017 for Great Britain Patent Application No. GB 1614645.8.

*Primary Examiner* — Nicholas K Wiltey
(74) *Attorney, Agent, or Firm* — Neal, Gerber & Eisenberg LLP; James P. Muraff

(57) ABSTRACT

Systems and methods for planning a path of a vehicle are provided. One system comprises a location-determining receiver for determining location data representing a current vehicle location and a guidance module for identifying at least one geospatial region encompassing the current vehicle location based on geographical information retrieved from a guidance database. The guidance module is capable of generating a list of potential guidance lines based on the at least one geospatial region, each geospatial region being associated with at least one guidance line, each of the potential guidance lines on the list ranked based on one or more guidance criteria retrieved from the guidance database. The system further includes a user interface for displaying the guidance lines on the list to an operator of the vehicle for selection of a selected one of the potential guidance lines for controlling the path of the vehicle.

20 Claims, 6 Drawing Sheets

(56) References Cited

U.S. PATENT DOCUMENTS

| | | |
|---|---|---|
| 7,010,425 B2 | 3/2006 | Gray et al. |
| 7,110,881 B2 | 9/2006 | Gray et al. |
| 7,228,214 B2 | 6/2007 | Flann et al. |
| 8,186,288 B2 | 5/2012 | Chinkiwsky |
| 8,498,788 B2 | 7/2013 | Kondekar |
| 8,548,666 B2 | 10/2013 | Matthews |
| 8,577,558 B2 | 11/2013 | Mitchell |
| 8,688,306 B1 * | 4/2014 | Nemec ................. G05D 1/0214 104/250 |
| 2007/0021913 A1 | 1/2007 | Heiniger et al. |
| 2008/0040035 A1 * | 2/2008 | Emoto ............... G01C 21/3638 701/436 |
| 2009/0064144 A1 * | 3/2009 | Abhyanker ....... G06F 17/30241 718/100 |
| 2009/0171570 A1 * | 7/2009 | Chiba ................ G01C 21/3682 701/532 |
| 2009/0216406 A1 * | 8/2009 | Senneff ................ A01B 69/007 701/42 |
| 2010/0286859 A1 * | 11/2010 | Feigh .................... G05D 1/0044 701/25 |
| 2010/0332315 A1 * | 12/2010 | Kamar ................... G06Q 30/02 705/14.46 |
| 2011/0238457 A1 * | 9/2011 | Mason ............... G01C 21/3469 705/7.14 |
| 2012/0179306 A1 * | 7/2012 | Saiki ................... B60R 25/2072 701/2 |
| 2012/0259537 A1 | 10/2012 | Schmidt et al. |
| 2013/0013412 A1 * | 1/2013 | Altman ................... G09F 21/04 705/14.61 |
| 2013/0173114 A1 * | 7/2013 | Pillai .................... B62D 15/026 701/41 |
| 2014/0278090 A1 * | 9/2014 | Boes .................. G01C 21/3679 701/533 |
| 2016/0140842 A1 * | 5/2016 | Park .................... G08G 1/0112 340/905 |
| 2016/0232621 A1 * | 8/2016 | Ethington ........ G06Q 10/06315 |

* cited by examiner

SYSTEM AND METHOD FOR USING GEO-FENCED GUIDANCE LINES

TECHNICAL FIELD

This application generally relates to systems and methods for using guidance lines to plan the path of a work vehicle.

BACKGROUND

Work vehicles may be used for agricultural, forestry, construction, mining, or other applications that require off-road operation along one or more paths to traverse or navigate a work area. For example, a work vehicle (e.g., tractor) may be required to plant or harvest crops in an area of a field, or to distribute crop inputs, such as fertilizer or chemicals, over plants in the field. Many work vehicles include guidance systems to assist vehicle operators or drivers in planning a path or route for the vehicle to follow during field operations. For each field or work area, guidance systems can use stored or planned guidance lines to generate the paths, or otherwise direct the work vehicles from one location of the field to another. As an example, in a field that has a simple rectangular shape and plain topography, only a few guidance lines are required to define the linear edges or boundaries of the field, and the vehicle operator can cover the entire work area by following a single array of parallel paths that run through the field parallel to one of said linear edges.

By contrast, complex fields, with irregular polygonal shapes, complicated topography, and/or obstacles, require a larger number of guidance lines, and guidance line changes, to cover the irregularities in the field. Further, each guidance line change or adjustment can require numerous operator inputs, skilled decision-making, and extra time. As a result, existing guidance systems are difficult to use in complicated field structures and detract from the time available for field operations (e.g., planting, harvesting, spraying, treating, tilling, or other field work.) Accordingly, there is still a need in the art for an intelligent vehicle guidance system and method that can more effectively and precisely plan a path for the vehicle, as well as reduce and simplify operator interaction by automating guidance line selection during operation of the vehicle.

SUMMARY

The invention is intended to solve the above-noted problems by providing systems and methods for determining a path of a vehicle by providing a prioritized list of potential guidance lines based on predefined guidance criteria and a geospatial region that encompasses a current location of the vehicle.

For example, one embodiment provides a system for planning a path of a vehicle. The system comprises a location-determining receiver for determining location data representing a current vehicle location, and a guidance module for identifying at least one geospatial region encompassing the current vehicle location based on geographical information retrieved from a guidance database. The guidance module is capable of generating a list of potential guidance lines based on the at least one geospatial region, each geospatial region being associated with at least one guidance line, and each of the potential guidance lines on the list ranked based on one or more guidance criteria retrieved from the guidance database. The system further includes a user interface for displaying the guidance lines on the list to an operator of the vehicle for selection of a selected one of the potential guidance lines for controlling the path of the vehicle. In addition, the system includes a data storage device for storing the guidance module and the guidance database, and a data processor in communication with the data storage device for execution of the guidance module.

As another example, one embodiment provides a method for planning a path of a vehicle. The method comprises determining, using a location-determining receiver, location data representing a current vehicle location, and identifying, using a processor, at least one geospatial region encompassing the current vehicle location based on geographical information retrieved from a guidance database. The method further comprises generating, using the processor, a list of potential guidance lines based on the at least one geospatial region, each geospatial region being associated with at least one guidance line, each of the potential guidance lines on the list ranked based on one or more guidance criteria retrieved from the guidance database. In addition, the method comprises displaying, via a user interface, the guidance lines on the list to an operator of the vehicle for selection of a selected one of the potential guidance lines for controlling the path of the vehicle.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
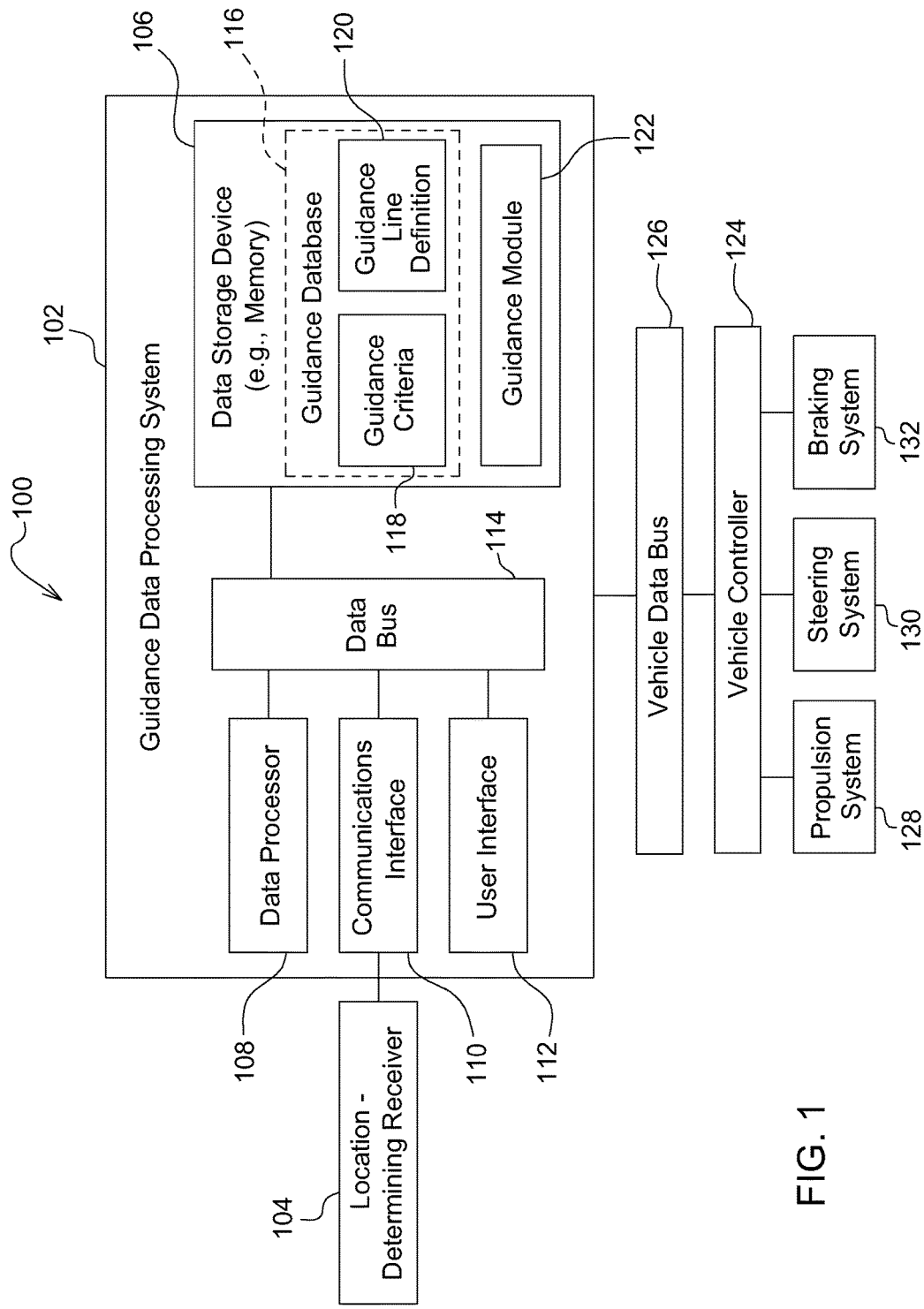
FIG. 1 is a block diagram of an example system for planning a path of a vehicle, in accordance with certain embodiments.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

As used herein, the term "guidance line" refers to a boundary, linear edge, or other geographical line defined by one or more straight lines, curved lines, arcs, line segments, or series of points or coordinates. The guidance lines can be formed using AB lines, AB curves, adaptive curves, or any other suitable guidance mode. Also as used herein, the term "geospatial region" refers to a geofenced area or other geographical region that is defined by a group of points or coordinates, or one or more linear or curved segments that form a boundary, or perimeter, of the region. A given work area can be defined by, or include, a preset number of guidance lines depending on the shape (e.g., rectangular, irregular polygon, etc.) and topography (e.g., terraces, catch basins, high or low areas, etc.) of the field, as well as any obstacles (e.g., trees, boulders, buildings or structures, etc.) present in the field. Each geospatial region can be a zone within a field or work area, and each field or work area can include a plurality of neighboring geospatial regions or zones that are contiguously arranged or at least partially overlap.

FIG. 1 illustrates an example system 100 for planning a path of a work vehicle, such as a tractor, mower, agricultural equipment, construction equipment, or other work vehicle, in accordance with embodiments. As shown, the system 100 includes a guidance data processing system 102 (e.g., an electronic data processing system) coupled to a location determining receiver 104. In some embodiments, the guidance data processing system 102 can be embedded in a vehicle electronics system of the vehicle. In other embodiments, the guidance data processing system 102 can be a stand-alone guidance computer communicatively coupled to the vehicle electronics system.

As shown in FIG. 1, the guidance data processing system 102 (also referred to herein as a "guidance system 102") comprises a data storage device 106, a data processor 108 (e.g., an electronic data processor), a communications interface 110, a user interface 112, and a data bus 114. In embodiments, the guidance system 102 can comprise a general purpose computer that is programmed with various programming instructions or modules stored in the data storage device 106, or elsewhere. The data processor 108 can communicate with any one of the data storage device 106, the communications interface 110, the user interface 112, and the location-determining receiver 104 via the data bus 114. In embodiments, the data processor 108 can comprise one or more of a microprocessor, a microcontroller, a programmable logic array, an application-specific integrated circuit, a logic device, or other electronic device for processing, inputting, outputting, manipulating, storing, or retrieving data.

The data storage device 106 can comprise one or more of electronic memory, nonvolatile random access memory (e.g., RAM), flip-flops, a computer-writable or computer-readable storage medium, a magnetic or optical data storage device, a magnetic or optical disc drive, a hard disk drive, or other electronic device for storing, retrieving, reading, or writing data. In some embodiments, the data storage device 106 includes a guidance database 116 for storing guidance data and geographical information associated with implementing the guidance data processing system 102 or the techniques disclosed herein. For example, as shown in FIG. 1, the guidance database 116 can store guidance criteria 118 and guidance line definitions 120. In other embodiments, the guidance database 116 may have a distributed architecture where one or more components are situated remote from another (e.g., in a network or cloud arrangement), but are still accessible by the data processor 108. In some cases, the information stored in the guidance database 116 can be received from other vehicle(s) working in the field at the same time as the vehicle or from one or more vehicles that worked in the field during a prior period in time.

According to embodiments, the guidance criteria 118 can include predefined rules, attributes, sorting logic, or algorithms for prioritizing, ranking, sorting, or otherwise selecting between a plurality of guidance line(s). In embodiments, the guidance criteria 118 includes one or more of the following: a prior usage of the guidance line (e.g., determining whether the guidance line is the most recently used guidance line, or was previously used to cover a corresponding area of the field by the same vehicle or another vehicle, etc.), a proximity of the guidance line to a current vehicle location, an approach angle to the guidance line from the current vehicle location, and a position of the guidance line in a predefined sequence for covering the field or work area (e.g., start with headlands or overlapping regions; start in an upper right of the field and move towards a lower left; enter at point A and exit and point B; etc.). In some embodiments, the guidance criteria 118 can be configured to meet operator preferences and/or vary depending on the field operation being performed. For example, for planting operations, the guidance criteria 118 may include a pointing direction of a planting implement of the vehicle, whereas for spraying operations, the guidance criteria 118 may include a spray angle of a spraying implement of the vehicle. In some embodiments, the guidance criteria 118 further includes predefined traffic patterns for a given field or work area to help maintain a clear path for the vehicle when the area is being worked by more than one vehicle.

In embodiments, the guidance line definitions 120 comprise geographical information including (i) one or more of geographical coordinates or points, line or line segment definitions, and/or boundary line definitions for defining a plurality of guidance lines, (ii) boundary or bounding box definitions for defining a plurality of geospatial regions with reference to at least one of the plurality of guidance lines, as well as one or more of geographical coordinates or points, line or line segments, and boundary lines, and (iii) names or other identifying information for each of the plurality of guidance lines and the plurality of geospatial regions. Further, the guidance line definitions 120 can be configured or arranged to attach additional geospatial attributes to each of the plurality of guidance lines, for example, by associating, in the guidance database 116, each guidance line to at least one of the plurality of geospatial regions based on common geographical information. For example, a guidance line that borders, traverses, or intersects two different geospatial regions may be associated with both regions in the guidance line definitions 120.

The data storage device 106 also stores one or more software program modules or software instructions, including a guidance module 122, for execution by the data processor 108. According to embodiments, the guidance module 122 is configured, or adapted, to identify at least one geospatial region encompassing a current vehicle location and generate a ranked list of potential guidance lines associated with the at least one geospatial region. For example, the guidance module 122 can comprise a program module or software instructions for, or otherwise be capable of, (i) identifying the at least one geospatial region encompassing the current vehicle location by comparing location data received from the location-determining receiver 104 to the guidance line definition data 120 and (ii) generating a ranked list of potential guidance lines based on the at least one geospatial region by identifying the guidance lines that are associated with the at least one geospatial region and applying the guidance criteria 118 to rank (or prioritize) the identified guidance lines. In embodiments, the guidance module 122 includes a list generator for providing the list of potential guidance lines based on the at least one geospatial region encompassing the vehicle's current location.

The user interface 112 can comprise one or more of a display (not shown), a touchscreen, a keyboard, a keypad, a switch, a pointing device (e.g., electronic or optical mouse), or other device for inputting, entering, receiving, capturing, displaying, or outputting data associated with the guidance data processing system 102 or the techniques disclosed herein. For example, the user interface 112 can be configured to display, to an operator of the vehicle, the potential guidance lines on the list generated by the guidance module 122. In some cases, the user interface 112 graphically displays a map comprising the at least one geospatial region and the potential guidance lines associated therewith. In other cases, the user interface 112 displays a list of names corresponding to the potential guidance lines. In some embodiments, the user interface 114 is further configured to receive a user input or otherwise enable the operator to select one of the potential guidance lines for controlling the path of the vehicle. In other embodiments, the guidance module 122 automatically selects a first ranked potential guidance line on the list as the guidance line selected for controlling the path of the vehicle. The user interface 112 can be further configured to graphically distinguish a selected guidance line (e.g., once a potential guidance line is selected from the list), an active guidance line (e.g., when the vehicle is currently navigating on a guidance line), or a geospatial region corresponding to either guidance line. For example, the user interface 112 may list the selected guidance line first within the list of potential guidance lines, or highlight, outline, or otherwise place prominence on the selected guidance line and/or the corresponding geospatial region (e.g., if the guidance lines are displayed on a map).

The communications interface 110 comprises one or more of a transceiver, data port (e.g., input/output data port), parallel data port, serial data port, or other communications devices that facilitates communications between the guidance data processing system 102 and a location-determining receiver 104. The location-determining receiver 104 comprises a receiver that uses satellite signals, terrestrial signals, or both to determine a current, or present, location or position of the vehicle. The location-determining receiver 104 can provide location data (e.g., longitudinal coordinates, latitudinal coordinates, altitude/elevation measurements, etc.) to the data processor 108 and/or the guidance module 122 via the communications interface 110 and the data bus 114.

In one embodiment, the location-determining receiver 104 is a Global Positioning System (GPS) receiver with a differential correction receiver for providing precise measurements of the geographic coordinates or position of the vehicle. As an example, the differential correction receiver may receive satellite or terrestrial signal transmissions of correction information from one or more reference stations with generally known geographic coordinates to facilitate improved accuracy in the determination of a location for the GPS receiver. In another embodiment, the location-determining receiver 104 is a Global Navigation Satellite System (GNSS) receiver that uses the GPS, Galileo, BeiDou, GLONASS, or other satellite systems to precisely pinpoint a current geographic location of the vehicle, for example, by using various satellite signals to triangulate the position of the vehicle.

In some embodiments, the communications interface 110 further includes one or more transceivers, ports, modems, or other communication devices for facilitating communication between the guidance data processing system 102 and one or more other vehicles, or a remote server in communication with said vehicles, for example, in order to receive information from, and/or provide information to, another vehicle that is simultaneously working a given field or work area, has previously worked the area, and/or will work the area at a future point in time. The communicated information may be used, for example, to avoid overlap and/or crossover between multiple vehicles working in a given area. In embodiments, the communicated information can include a current guidance line or path of the vehicle and/or any other vehicle(s) in the area, one or more previously-utilized guidance lines or paths of the vehicle and/or any other vehicle(s) in the area, and a current position of the vehicle and/or the other vehicle(s) in the area.

Referring again to FIG. 1, in embodiments, the system 100 can further comprise components of a vehicle electronics system, including a vehicle controller 124, a vehicle data bus 126, a propulsion system 128, a steering system 130, and a braking system 132. The vehicle data bus 126 can communicatively couple the vehicle controller 124 to the guidance data processing system 102, as well as other components (not shown) of the vehicle electronics system or one or more implement electronic systems coupled to the vehicle (e.g., digger, planting member, etc.). For example, outputs of the guidance data processing system 102 can be applied to an implement electronics system to enable control logic for input application machines (e.g., planters) and other equipment. In one embodiment, the guidance system 102 represents a network element that communicates with the vehicle controller 124 over the vehicle data bus 126, such as, e.g., a controller area network (CAN) bus.

The vehicle controller 124 can comprise one or more devices for controlling or navigating the vehicle consistent with a path determined or planned by the guidance module 122 or other instructions provided by the operator. The vehicle controller 124 may be configured to communicate data messages to the propulsion system 128, the steering system 130, and the braking system 132 in accordance with the planned path of the vehicle or other instructions.

The steering system 130 can comprise one or more of a rack-and-pinion steering system, a mechanical linkage, a hydraulic steering system, an electro-hydraulic steering system, an electronic drive-by-wire system, an electrically-assisted mechanical steering linkage, or other mechanism for steering or turning one or more wheels of the vehicle. The steering system 130 can include an electronic or electrical interface for communicating data messages via the vehicle data bus 126 and for monitoring and controlling the steering of the vehicle. For example, the steering system 130 is capable of communicating data messages (e.g., control and status message) to the vehicle controller 124 or the data processor 108.

The propulsion system 128 can comprise one or more of an internal combustion engine, an electric motor, a hybrid propulsion configuration that comprises a combination of an internal combustion engine and one or more electric motors, or the like. The propulsion system 128 has an electrical or electronic interface (e.g., engine controller, transmission controller, or a combination thereof) for communicating data messages via the vehicle data bus 126 and for monitoring and controlling the propulsion of the vehicle. For example, the propulsion system 128 is capable of communicating the data messages (e.g., control and status messages) to the vehicle controller 124 or the data processor 208.

The braking system 132 comprises one or more of a mechanical braking system, a cable braking system, a hydraulic braking system, an electromechanical braking system, a pneumatic braking system, an air-braking system, a brake-by-wire system, or the like. The braking system 132 has an electronic or electrical interface (e.g., braking controller) for communicating data messages via the vehicle data bus 126 and for monitoring and/or controlling the braking, deceleration, slowing, or stopping of the vehicle. For example, the braking system 132 is capable of communicating data messages (e.g., control and status messages) to the vehicle controller 124 or the data processor 108.

Figure 2:
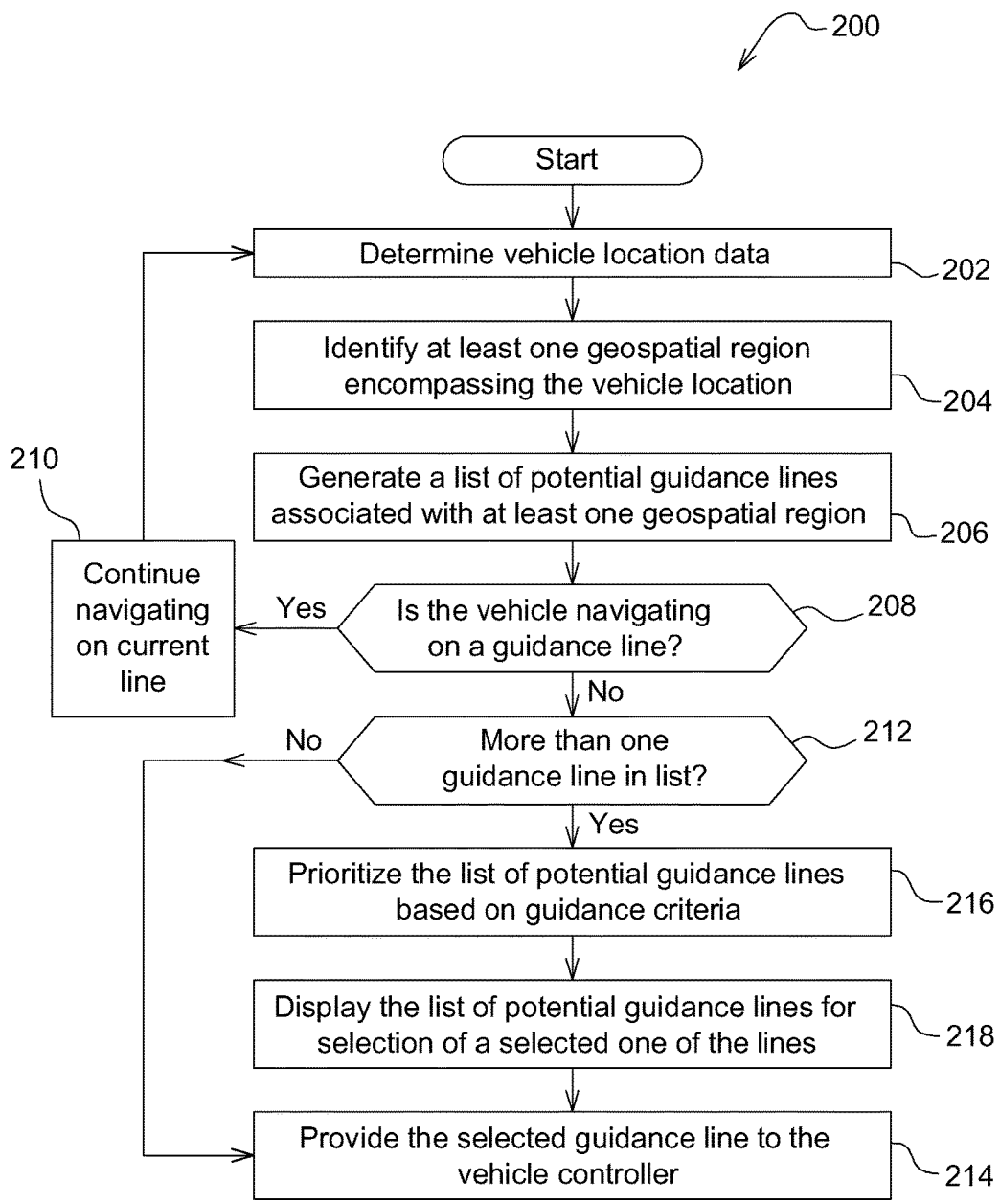
FIG. 2 is a flowchart of an example method for planning a path of a vehicle, in accordance with certain embodiments.

Referring now to FIG. 2, shown is an example method 200 for planning or determining a path of a vehicle, in accordance with embodiments. The method 200 can be carried out by the system 100, or more specifically, through interactions between various components of the system 100 that are facilitated by software executing on one or more electronic data processors associated with said components. For example, the guidance data processing system 102 may interact with the location-determining receiver 104, and in some cases, the vehicle controller 124, to carry out the operations of the method 200, and all or a portion of the method 200 can be implemented in software (such as, e.g., the guidance module 122) that is executable by the data processor 108 and stored in the data storage device 106. Accordingly, in the following paragraphs, the method 200 will be described with reference to the components of the system 100.

Figure 3:
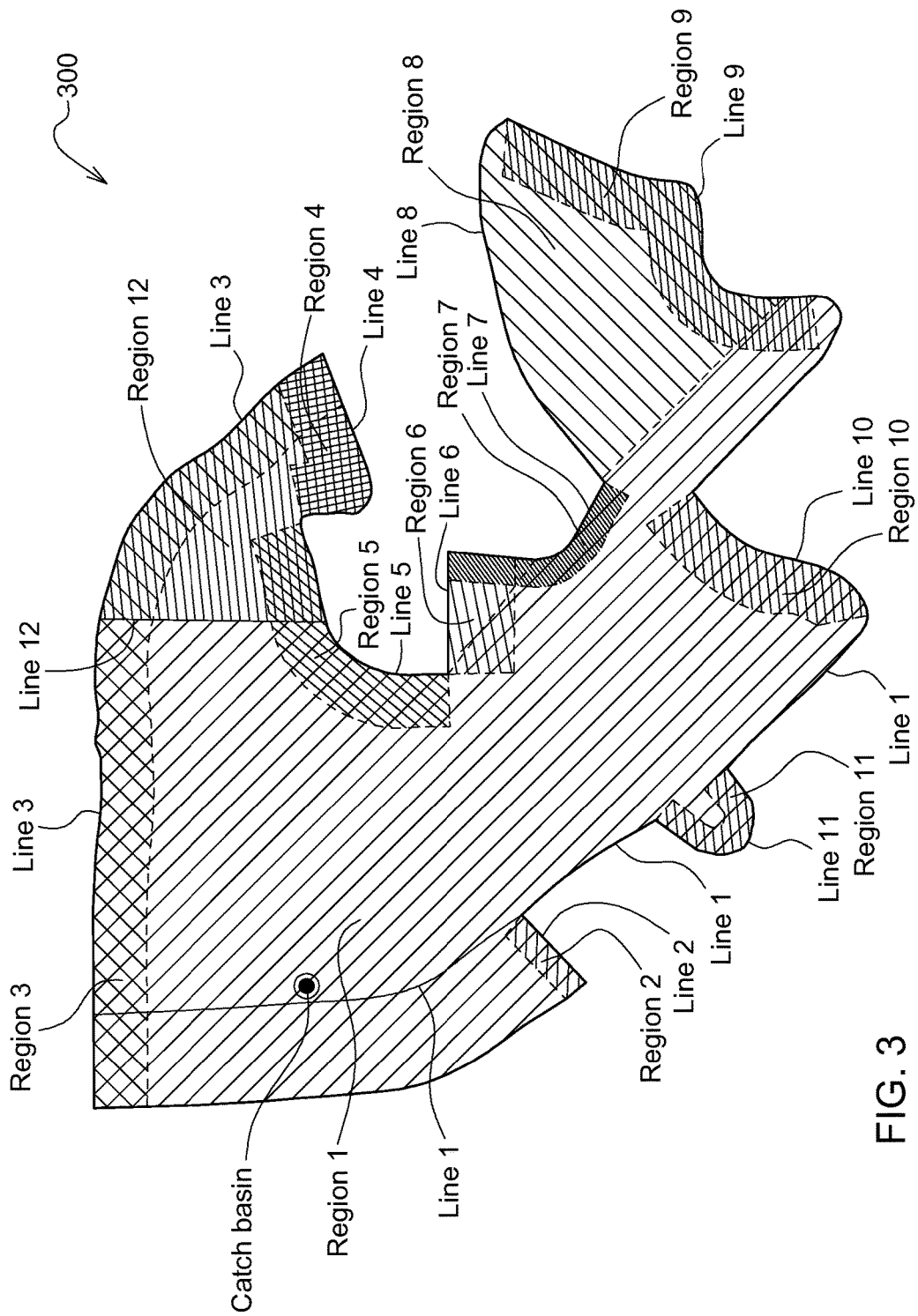
FIG. 3 is a top plan view of an example work area having a plurality of geofenced guidance lines, in accordance with certain embodiments.

For the sake of illustration, the method 200 will also be described with reference to FIG. 3, which depicts an example field 300 with a number of complex boundaries or linear edges that necessitate a large number of guidance lines to traverse the work area. As shown, the field 300 has an irregular overall shape that is segregated, zoned, or apportioned into a plurality of guidance lines 1-12 and a plurality of corresponding geospatial regions 1-12, in accordance with embodiments. More specifically, each of the geospatial regions 1-12 have been drawn according to, or configured (e.g., shaped) based on, a corresponding one of the guidance lines 1-12. In the illustrated example, because each of the guidance lines 1-12 touches, intersects, or meets at least one other guidance line, each of the geospatial regions 1-12 at least partially overlaps with one or more neighboring geospatial regions. For example, as shown in FIG. 3, Region 1 corresponds to Line 1 and covers a majority of the field 300. At the boundaries or edges of the field 300, additional geospatial regions and corresponding guidance lines are provided, for example, to cover the headland areas at the boundaries of the field 300, or to cover irregular, contiguous sections of the field 300 that extend off of Region 1. For example, Regions 2, 3, 5, 7, 10, and 11 overlap Region 1 adjacent to the field boundaries formed at Lines 2, 3, 5, 7, 10, and 11, respectively, and thereby, provide coverage of the headland areas in the field 300. As another example, Regions 12 and 8 cover sections of the field 300 that branch out from an adjoining virtual boundary of Region 1 (e.g., without overlapping Region 1).

Referring back to FIG. 2, the method 200 begins at step 202, where location data representing a current location of the vehicle (e.g., within the field 300) is determined by the location-determining receiver 104. The location data can be provided to the data processor 108, and/or the guidance module 122 executing thereon, via the communications interface 110 and the data bus 114. In some embodiments, the location-determining receiver 104 provides the location data to the guidance system 102 only if new location data is detected (e.g., upon comparison with previously-acquired location data). In other embodiments, the location-determining receiver 104 continuously or periodically provides the location data to the guidance system 102 and the data processor 108 determines whether the received location data is new (e.g., the vehicle has moved) or old (e.g., the vehicle is stationary).

At step 204, based on the location data received from the location-determining receiver 104 and geographical information retrieved from the guidance database 116, the guidance system 100, or more specifically, the guidance module 122, identifies at least one geospatial region that encompasses the current location of the vehicle. For example, the guidance module 122 may be capable of, or programmed with software instructions for, comparing the received location data with guidance line definitions 120 stored in the guidance database 116 in order to identify one or more geospatial regions that encompass (e.g., include or cover) the current vehicle location. In one embodiment, the guidance module 122 searches the guidance line definitions 120 for points, coordinates, line segments, boundaries, or boundary boxes that include, match, or otherwise correspond to the vehicle location data received from the location-determining receiver 104. The guidance module 122 then selects, as the identified geospatial region(s), each geospatial region including at least one of the points, coordinates, line segments, boundaries, and/or bounding boxes that correspond to the vehicle location data. In one embodiment, the guidance module 122 first searches for a broadest category (e.g., bounding box) that encompasses the vehicle location, in order to quickly pinpoint a relevant area of the field, and then gradually filters through the remaining, more specific categories (e.g., boundaries, coordinates, etc.), as needed, to identified the corresponding geospatial region(s).

At step 206, the guidance system 100, or more specifically, the guidance module 122, generates a list of potential guidance lines based on the at least one geospatial region identified in step 204. For example, the guidance module 122 may be capable of, or programmed using software instructions for, identifying each guidance line associated with the identified geospatial region(s) based on the guidance line definitions 120 stored in the guidance database 116. In embodiments, the guidance line definitions 120 are capable of associating a given geospatial region with multiple guidance lines depending on a configuration of the field. For example, in some cases, a given guidance line may cross or traverse more than one geospatial region, and/or a given geospatial region may be bordered by or at least partially include more than one guidance line. Accordingly, the list generated at step 206 can include one or more guidance lines for each geospatial region identified at step 204.

Figure 4:
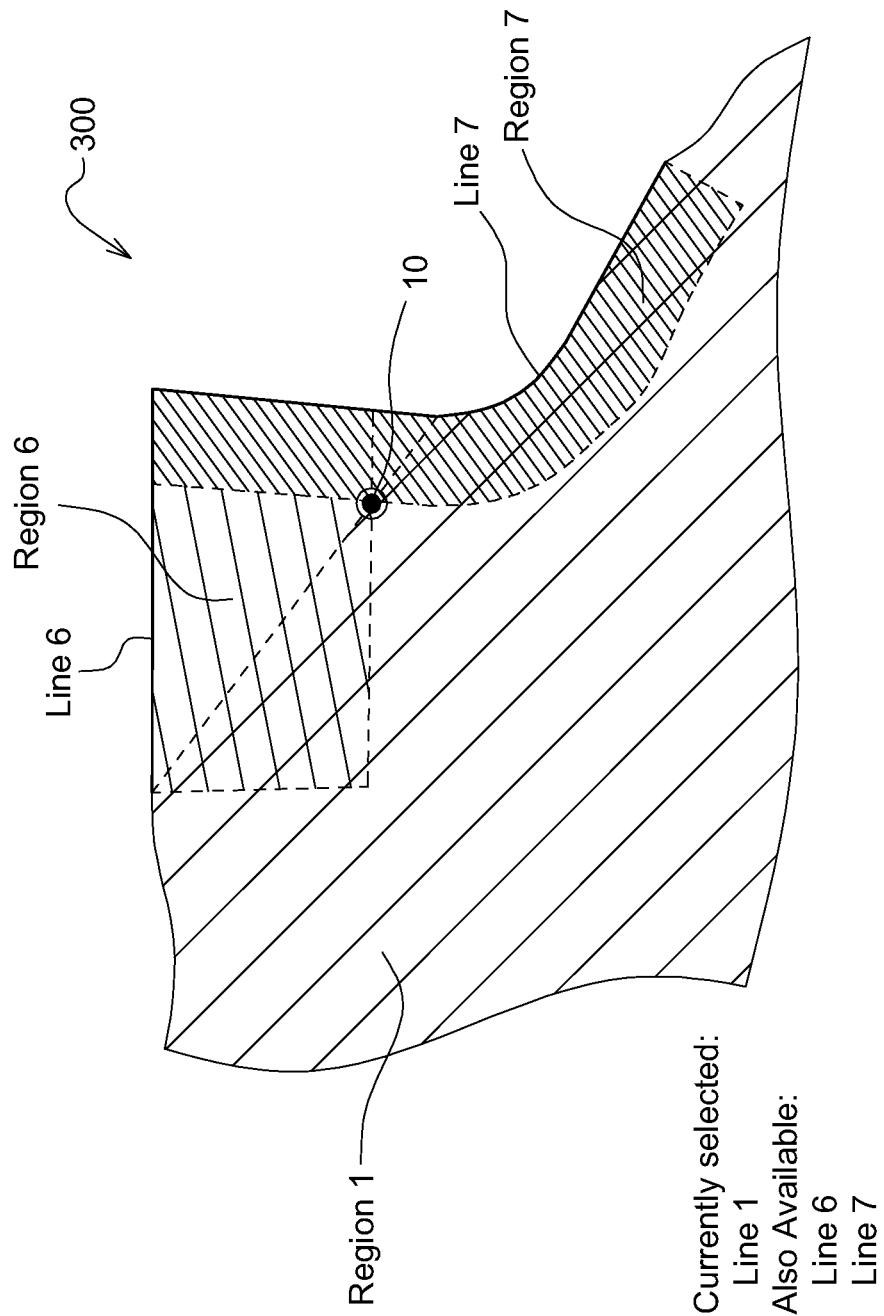
FIG. 4 is a top plan view of a portion of the example work area shown in FIG. 3, in accordance with certain embodiments.

As an example, FIG. 4 shows a close-up view of a portion of the field 300 that contains Regions 6 and 7 and corresponding Lines 6 and 7. In FIG. 4, the vehicle is positioned (or detected) at a location 10 that overlaps with three geospatial regions, namely Region 1, Region 6, and 7. For example, the vehicle may have been working in Region 1 just prior to being detected at the location 10 (e.g., the "new" location) at step 202. At step 204, based on the location 10, the guidance module 122 may determine that Region 1 is still a valid or applicable geospatial region for the vehicle, but that the new location 10 is now positioned in Regions 6 and 7 as well. Accordingly, at step 206, the list of potential guidance lines generated by the guidance module 122 may include Lines 1, 6, and 7.

Referring back to FIG. 2, in some embodiments, the method 200 further includes, at step 208, determining whether the vehicle is currently navigating on a guidance line, or in an active guidance mode. For example, the guidance module 122 may compare the list of potential guidance lines to a currently-selected guidance line to determine whether the currently-selected guidance line is included on the list of potential guidance lines. If the answer is "Yes," the method 200 continues to step 210, allowing the vehicle to continue navigating according to the currently-selected guidance line. If, on the other hand, the answer is "No" (e.g., the currently-selected guidance line is no longer valid, applicable, or available), the method 300 can continue to step 212.

Figure 5:
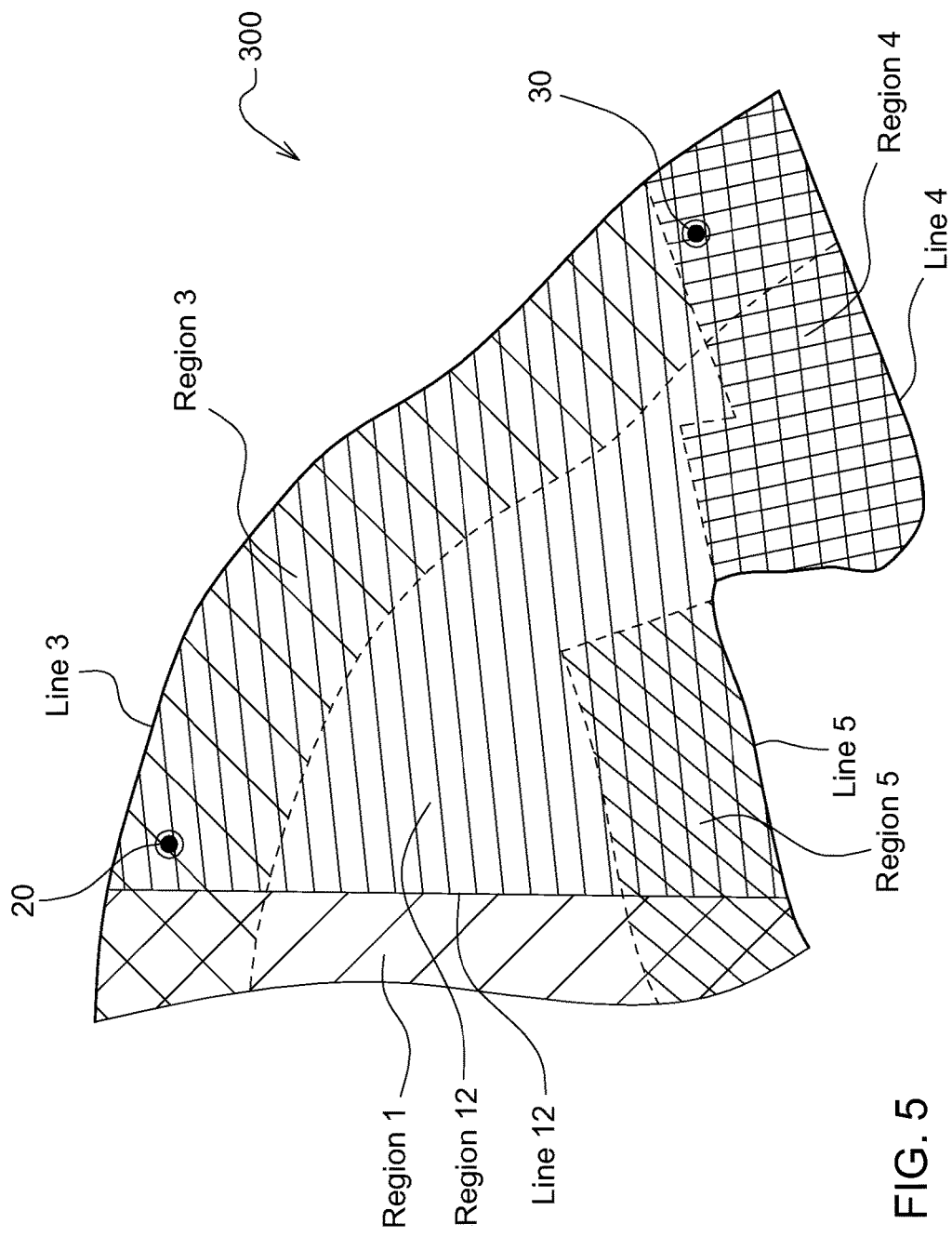
FIG. 5 is a top plan view of another portion of the example work area shown in FIG. 3, in accordance with certain embodiments.
Figure 7:
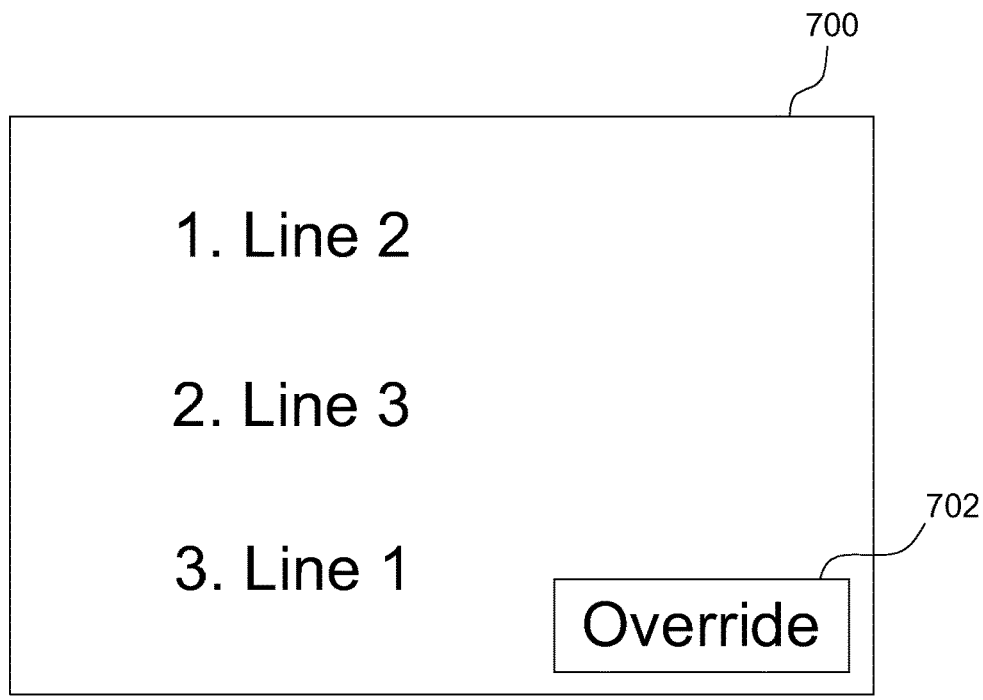
FIG. 7 is a diagram of another example user interface for planning a path of a vehicle, in accordance with certain embodiments.

For example, FIG. 7 shows a close-up view of a portion of the field 300 that contains Region 12 and corresponding Line 12, as well as overlapping Regions 3, 4, and 5, and corresponding Lines 3, 4, and 5. In FIG. 5, the vehicle is positioned at a first location 20 at a first point in time and a second location 30 at a second point in time after the first point in time. As an example, the vehicle may have started navigating the field 300 along Line 3, for example, starting at the far left corner of Region 3 shown in FIG. 3. Upon crossing Line 12 and entering Region 12, new location data corresponding to the vehicle location 20 may be received from the location-determining receiver 104 at step 202. At step 204, the guidance module 122 may identify the current Region 3 and a new Region 12 as two available or activated geospatial regions that encompass the new vehicle location 20, and at step 206, the guidance module 122 may generate a list of potential guidance lines that contains Lines 3 and 12. At step 208, the guidance module 122 may determine that the vehicle is already navigating on one of the potential guidance lines, i.e. Line 3. In such cases, the method 200 may continue to step 210, where the guidance module 122 continues navigating on the active guidance line, i.e. Line 3. The guidance module 122 may keep the vehicle on Line 3 until the vehicle reaches the end of Line 3, or Region 3, for example, upon entering the second location 30 shown in FIG. 5. As shown, the second location 30 is positioned in Regions 12 and 4 and outside of Region 3. Accordingly, the vehicle is no longer navigating on Line 3 at the location 30 and therefore, the outcome of the determination at step 208 is "No." At this point, the method 200 can continue to step 212.

Referring back to FIG. 2, at step 212, the guidance module 122 determines whether more than one guidance line (e.g., n>1) is on the list of potential guidance lines generated at step 206, in accordance with embodiments. At step 212, if the answer is "No" (e.g., n=1), the method 200 continues to step 214, where the guidance module 122 provides the single guidance line on the list to the vehicle controller 124 to control the path of the vehicle. This may occur, for example, if the vehicle is positioned in the middle of Region 1 where there are no other (e.g., overlapping) geospatial regions. However, if the answer at step 212 is "Yes," the method 200 can continue to step 216.

According to embodiments, at step 216, the guidance module 122 prioritizes, sorts, or ranks the potential guidance lines on the list generated at step 206 in accordance with, or based on, the guidance criteria 118 stored in the guidance database 116. For example, upon determining that the list contains more than one potential guidance line at step 212, the guidance module 122 may be configured to retrieve the guidance criteria 118 from the guidance database 116 and to apply the guidance criteria 118 to the list of potential guidance lines to determine which line has priority over the others, a sequential order for the potential guidance lines, or any other preferences or attributes for the listed guidance lines. In embodiments, one or more of the guidance criteria 118 can be user-configured, including, for example, entered by the vehicle operator or otherwise based on preferences of the vehicle operator, an employer of the operator, an owner of the field 300 and/or the vehicle, or another entity associated with the field 300 and/or the vehicle. The guidance criteria 118 can also be configured to maximize efficiency of field operations in the field 300, including, for example, minimizing wastage during an application (e.g., spraying, seeding, fertilizing, etc.), minimizing overlap of travel paths by the vehicle or any other vehicles working the field 300 at the same time, minimizing travel time and fuel usage, and minimizing difficulty in maneuvering the vehicle (e.g., by avoiding sharp turns or tight approach angles).

For example, the guidance criteria 118 can include determining whether any of the potential guidance lines have been previously used by the vehicle, or another vehicle in the field 300, during the current field operation and if any lines have been used, ranking those guidance lines at a bottom of the list. As another example, the guidance criteria 118 can include determining a distance to each potential guidance line from a current location of the vehicle and ranking the potential guidance lines according to a proximity to the current vehicle location. As another example, the guidance criteria 118 can include determining, for each guidance line, an approach angle to the current vehicle location and ranking the potential guidance lines according to the closest approach angle. In yet another example, the guidance criteria 118 can include determining whether any of the potential guidance lines would interfere with or overlap a path of any other work vehicles in the field 300, and if so, ranking those lines at a bottom of the list.

In some embodiments, the guidance criteria 118 includes a predefined sequence for navigating a given work area, such as, e.g., cover the headlands at a top of the field (e.g., Region 3) first, then a central zone of the field (e.g., Region 1), and lastly the headlands at a bottom of the field (e.g., Region 10), or cover all of the external and internal headlands first and then the central zone of the field. In such cases, the list of potential guidance lines can be prioritized or sorted such that the first prioritized potential guidance line is the guidance line that sequentially follows the most recently used guidance line. For example, referring to FIG. 5, a predefined sequence stored in the guidance criteria 118 may include the following order for the guidance lines, in order of importance: Line 3, Line 4, Line 12, and Line 5. Accordingly, at the second location 30, where the list of potential guidance lines includes Line 4 and Line 12, Line 4 can be prioritized over Line 12 and selected for controlling the path of the vehicle.

The method 200 further includes, at step 218, displaying the potential guidance lines on the list to an operator of the vehicle for selection of a selected one of the potential guidance lines for controlling the path of the vehicle. For example, the potential guidance lines can be displayed to the vehicle operator on the user interface 112 (e.g., a display screen or touchscreen), and the user interface 112 can include an input device (e.g., a touchscreen, keyboard, joystick, or mouse) configured to receive user selection of the selected one of the potential guidance lines. In embodiments, the potential guidance lines on the list can be displayed according to, or reflecting, the prioritization determined in step 216. From step 218, the method 200 continues to step 214, where the guidance module 122 provides the selected potential guidance line, or the single guidance line (e.g., if the determination at step 212 is "No"), to the vehicle controller 124 to resume guidance of the vehicle. Upon receiving the selected guidance line, the vehicle controller 124 can direct the path of the vehicle by sending control messages to one or more of the propulsion system 128, steering system 130, and braking system 132.

In some embodiments, the guidance line for controlling the path of the vehicle is selected by the user, or received via the user interface 112 as a user input selecting one of the potential guidance lines displayed thereon, for example, in a user-selectable mode of the user interface 112. In other embodiments, the guidance line for controlling the path of the vehicle is automatically selected, or dynamically determined, by the guidance module 122. For example, the guidance module 122 can be configured to automatically select a first prioritized, or top-ranked, potential guidance line as the selected one of the potential guidance lines. In some cases, the vehicle operator may be provided with an option to override the automatically-selected guidance line by selecting, via the user interface 112, another one of the potential guidance lines on the list.

Figure 6:
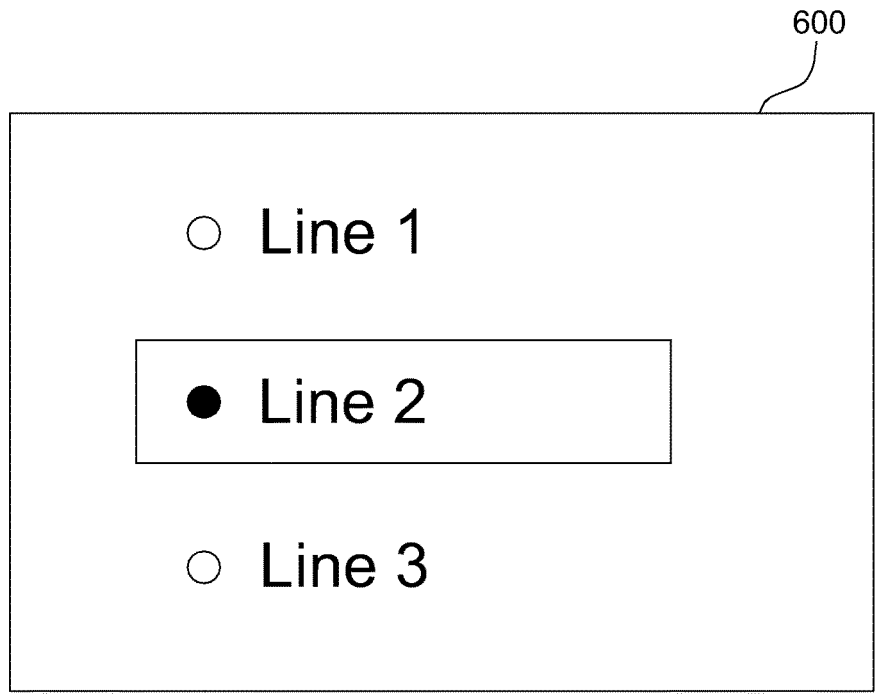
FIG. 6 is a diagram of an example user interface for planning a path of a vehicle, in accordance with certain embodiments.

In embodiments, the user interface 112 can be configured to display the potential guidance lines as a textual list of the names of the potential guidance lines, the names being retrieved from the guidance line definitions 120. In some cases, the textual list can display all of the guidance lines in an undefined order and activate, highlight, or outline the user-selected one of the potential guidance lines, or the first prioritized potential guidance line, depending on how the list is prioritized. As an example, FIG. 6 illustrates an exemplary user interface 600 displaying a sorted list of three potential guidance lines and Line 2 as the selected one, or first prioritized, potential guidance line. In other cases, the textual list can display the guidance lines in order of importance or priority (e.g., the first prioritized potential guidance line is listed first in the list, etc.). As an example, FIG. 7 illustrates an exemplary user interface 700 displaying a sorted list of potential guidance lines, with Line 2 sorted to the top of the list. As shown in FIG. 7, the user interface 700 may include an override option 702 to allow the user to alter an automatically-selected guidance line, for example, in view of operator preferences or a real-time condition or event that affects or overrides the stored guidance criteria 118.

In some embodiments, in addition to, or instead of, listed names, the user interface 112 can be configured to display the potential guidance lines in the form of, or overlaying, a map, for example, as shown in FIGS. 3-5. The map may be interactive, for example, by highlighting an active or currently-selected geospatial region and/or guidance line, by highlighting a newly-active or newly-applicable geospatial region and/or guidance line when the user moves to a new location on the map (e.g., from the first location 20 to the second location 30), by highlighting all of the available geospatial regions and/or guidance lines identified at steps 204 and 206, by displaying the potential guidance lines on the map and allowing the vehicle operator to select, via the map, a selected one of the guidance lines for controlling the path of the vehicle, and/or by allowing the vehicle operator to override a currently-selected region and/or line by selecting, on the map, a new geospatial region and/or guidance line. As shown in FIG. 4, in some cases, the user interface 112 may display both a map and a list of potential guidance lines, including the names of a currently selected or active guidance line, and other available guidance lines.

Thus, systems and methods are described herein for facilitating an autonomous guidance mode for controlling the path of a work vehicle. According to embodiments, a guidance module uses predefined geo-fenced guidance line data to identify a list of potential guidance lines for a new vehicle location received from a location-determining receiver of the vehicle, and predefined guidance criteria to rank or prioritize the potential guidance lines on the list. The potential guidance lines on the list can be displayed to the vehicle operator for selection of a selected one of the potential guidance lines, the selected one being provided to the vehicle controller to control the path of the vehicle. The selection can be made based on either a user input received via a user interface or an automatic selection by the guidance module (e.g., the first prioritized potential guidance line). Accordingly, the techniques disclosed herein can reduce the amount of skill and interaction needed from a vehicle operator while engaged in a field operation and can produce more efficient path plans that, for example, avoid unnecessary fuel consumption, increased travel distances, excessive vehicle turns, or increased vehicle operation time. Further, these techniques can enhance autonomous machine operations by allowing users to develop and define the criteria for making guidance decisions, thereby enabling more precise and customized control of the vehicle during field operations.

In certain embodiments, the process descriptions or blocks in the figures, such as FIG. 2, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A system for planning a path of a vehicle, the system comprising:

a location-determining receiver configured for determining location data representing a current vehicle location;

a guidance module configured for:
  determining a plurality of geospatial regions defined within a field based on boundaries of the field, wherein each geospatial region in the field partially overlaps with one or more other ones of the geospatial regions in the field;
  identifying at least two geospatial regions of the plurality of determined geospatial regions encompassing the current vehicle location based on geographical information retrieved from a guidance database;
  generating a list of potential guidance lines based on the identified geospatial regions, each geospatial region being associated with at least one guidance line defined by a linear edge of the geospatial region; and
  ranking each of the potential guidance lines based on one or more guidance criteria retrieved from the guidance database;

a user interface configured for displaying the potential guidance lines on the list to an operator of the vehicle for selection of a selected one of the potential guidance lines for controlling the path of the vehicle;

a data storage device configured for storing the guidance module and the guidance database;

a data processor in communication with the data storage device configured for execution of the guidance module;

a vehicle steering system; and a vehicle controller configured for controlling the vehicle steering system based on the selected one of the potential guidance lines.

2. The system of claim 1, wherein the one or more guidance criteria include at least one of an approach angle to the guidance line from the current vehicle location, a priority sequence for covering subsections within the field, or a relative position of the potential guidance lines in an ordered sequence.

3. The system of claim 1, wherein the guidance module is further configured for automatically selecting a first ranked potential guidance line as the selected one of the potential guidance lines.

4. The system of claim 1, wherein the user interface is further configured for receiving a user input selecting one of the potential guidance lines as the selected one of the potential guidance lines.

5. The system of claim 1, wherein displaying the potential guidance lines includes graphically displaying the at least one geospatial region and the potential guidance lines on a map.

6. The system of claim 1, wherein displaying the potential guidance lines includes displaying a list of names corresponding to the potential guidance lines.

7. The system of claim 1, wherein the geographical information includes line segment definitions for defining a plurality of guidance lines and boundary box definitions for defining a plurality of geospatial regions, each boundary box definition including at least one of the plurality of guidance lines.

8. The system of claim 1, wherein the guidance module is further configured for providing the selected one of the potential guidance lines to the vehicle controller for controlling the path of the vehicle.

9. The system of claim 1, wherein the selected one of the potential guidance lines traverses two or more of the plurality of geospatial regions.

10. The system of claim 1, wherein the vehicle controller is further configured for controlling the vehicle steering system to traverse from a first geospatial region to a second geospatial region of the plurality of geospatial regions.

11. The system of claim 1, wherein an area covered by the plurality of geospatial regions is contiguous.

12. The system of claim 1, wherein each of the plurality of geospatial regions is defined by a plurality of boundary segments in which at least two of the boundaries segments are a different shape.

13. A method for planning a path of a vehicle, comprising:
  determining a plurality of geospatial regions defined within a field based on boundaries of the field, wherein each geospatial region in the field partially overlaps with one or more other ones of the geospatial regions in the field;
  determining, using a location-determining receiver, location data representing a current vehicle location;
  identifying, using a processor, at least two geospatial regions of the plurality of determined geospatial regions encompassing the current vehicle location based on geographical information retrieved from a guidance database;
  generating, using the processor, a list of potential guidance lines based on the identified geospatial regions, each geospatial region being associated with at least one guidance line defined by a linear edge of the geospatial region;
  ranking each of the potential guidance lines based on one or more guidance criteria retrieved from the guidance database;
  displaying, via a user interface, the potential guidance lines on the list to an operator of the vehicle for selection of a selected one of the potential guidance lines for controlling the path of the vehicle; and
  controlling, by a vehicle controller, a vehicle steering system of the vehicle based on the selected one of the potential guidance lines.

14. The method of claim 13, wherein the one or more guidance criteria include at least one of an approach angle to the guidance line from the current vehicle location, a priority sequence for covering subsections within the field, or a relative position of the potential guidance lines in a ordered sequence.

15. The method of claim 13, further comprising automatically selecting, using the processor, a first ranked potential guidance line as the selected one of the potential guidance lines.

16. The method of claim 13, further comprising receiving, via the user interface, a user input selecting one of the potential guidance lines as the selected one of the potential guidance lines.

17. The method of claim 13, wherein displaying the potential guidance lines includes graphically displaying the at least one geospatial region and the potential guidance lines on a map.

18. The method of claim 13, wherein displaying the potential guidance lines includes displaying a list of names corresponding to the potential guidance lines.

19. The method of claim 13, wherein the geographical information includes line segment definitions for defining a plurality of guidance lines and boundary box definitions for defining a plurality of geospatial regions, each boundary box definition including at least one of the plurality of guidance lines.

20. The method of claim 13, further comprising providing, using the processor, the selected one of the potential guidance lines to the vehicle controller for controlling the path of the vehicle.

\* \* \* \* \*